United States Patent [19]

Brander et al.

[11] Patent Number: 4,556,569
[45] Date of Patent: Dec. 3, 1985

[54] SOY MILK CONTAINING CHEESE ANALOG

[75] Inventors: Rita W. Brander, New Rochelle, N.Y.; Teresa A. Raap, Ridgefield, Conn.; Joseph F. Gessler, West Milford, N.J.

[73] Assignee: General Foods Corporation, White Plains, N.Y.

[21] Appl. No.: 591,294

[22] Filed: Mar. 19, 1984

[51] Int. Cl.$^4$ ............................................. A23C 20/00
[52] U.S. Cl. .................................. 426/104; 426/582; 426/602; 426/613; 426/634
[58] Field of Search ............... 426/104, 582, 634, 602, 426/613

[56] References Cited

U.S. PATENT DOCUMENTS

| | | | |
|---|---|---|---|
| 3,743,516 | 7/1973 | Lundstedt et al. | 426/582 X |
| 4,080,477 | 3/1978 | Tsumura et al. | 426/582 X |
| 4,105,803 | 8/1978 | Peng | 426/634 X |
| 4,110,484 | 8/1978 | Rule et al. | 426/582 |

FOREIGN PATENT DOCUMENTS 1022382 12/1977 Canada ............................... 426/634

*Primary Examiner*—Robert Yoncoskie
*Attorney, Agent, or Firm*—Richard D. Schmidt; Joseph T. Harcarik; Daniel J. Donovan

[57] ABSTRACT

A cheese analog product made with vegetable protein rather than dairy protein having a natural pH of about 7.0±0.5. Soy milk in the weight percent range of 9 to 19%, vegetable oil in the weight percent range of 14 to 22%, dairy whey in the weight percent range of 7 to 13%, caseinate in the weight percent of 2 to 10% and water in the weight percent range of 38 to 58% along with any flavorants and colorants comprises the water dispersion cheese analog.

4 Claims, No Drawings

SOY MILK CONTAINING CHEESE ANALOG

FIELD OF THE INVENTION

The present invention relates to cheese analog products which are, basically, water dispersions of protein and vegetable oil and which are made for use in lieu of processed cheese products.

DESCRIPTION OF THE PRIOR ART

Cheese analog products have been provided which are made to be used in lieu of processed cheese foods. These cheese analog products are essentially water dispersions of vegetable oil and caseinates as the primary source of protein used in such products. These analog products do not contain the high levels of milk curd normally used in making processed cheese foods. These cheese analog products usually are also made with emulsifying salts such as citrates, phosphates and tartrates to impart firmness, spreadability, smoothness and buffering power, in order to obtain the desired mouthfeel, texture and stability for the product.

These prior art cheese analog products, thus, usually contain the following amounts of the following components:

| Component of Prior Art Cheese Analog | Weight % Range of Component In Prior Art Cheese Analog |
|---|---|
| Water | 35 to 50 |
| Caseinate | 23 to 29 |
| Vegetable Oil | 22 to 33 |
| Buffering Agent | 0.2 to 1.1 |
| Citric acid | 0.2 to 1.0 |
| Salt | 0.5 to 2.5 | with the remainder, if any, being flavorings and colorants as desired, to total 100%.

In order to provide cheese analog products that are more economical to make, and/or have a lower calorific content and/or to eliminate the need for a buffering agent, attempts have been made to reformulate the prior art formulations by replacing some or all of the various components therein. However, it has not been readily possible to date to provide a reformulated product that would have these above noted, desired benefits, while at the same time, retaining and/or improving upon other qualities or characteristics of the prior art cheese analog products that are needed for consumer acceptance purposes, i.e., the good melting and mouthfeel characteristics of processed cheese products and good freeze/thaw characteristics. Further, where prior attempts were made by the present inventors to use soybean derivatives such as soy flour and concentrated soy isolate in such reformulated cheese analog products as a source of protein, they were not able to avoid grittiness and off-flavors that were imparted to the reformulated products by such soybean products.

SUMMARY OF THE PRESENT INVENTION

An object of the present invention is to provide a cheese analog product which has a relatively low caseinate content and which does not require the use of a buffering agent therein.

A further object of the present invention is to provide a cheese analog product which has a relatively low calorific content and which has good melting, mouthfeel and freeze/thaw characteristics.

A further object of the present invention is to provide a cheese analog product which employs a soy based product as a primary source of protein therein without imparting any grittiness or off-flavor to the analog product.

A further object of the present invention is to provide a means for employing vegetable protein such as soy milk in lieu of dairy protein in cheese analog products.

These and other objects of the present invention are achieved, in accordance with the present invention, by replacing, in the prior art cheese analog formulations, a portion or all of the caseinate otherwise employed therein with a combination of soy milk and dairy whey.

DESCRIPTION OF THE PREFERRED EMBODIMENTS

The soy milk used in the present invention is used in the form of dried soy milk that contains the following components in the following weight %'s:

| Components of Soy Milk | Weight % of Component | |
|---|---|---|
| | Broad | Preferred |
| Protein (NX 5.71) | 35 to 48 | 40 to 43 |
| Moisture | 2 to 6 | 3.8 to 4.4 |
| Ash | 5 to 6.5 | 5.5 to 5.9 |
| Fat | 15 to 25 | 19 to 21 |
| Fiber | 0.05 to 1.0 | 0.1 to 0.3 |
| Carbohydrate | 24 to 32 | 26 to 30 |
| Calcium, as mg/100 gms. of product | 200 to 350 | 250 to 300 |
| | 100 | 100 |

The dried soy milk is a dry form of soy milk which is the aqueous extract, with alkali, of soybean and which has a pH of 9.5±0.5 and an oil content of about 3 to 4 weight %.

Although the caseinates that are used in the cheese analog composition of the present invention are often referred to in the art as being water soluble, they are, more precisely, water dispersible since they are relatively high molecular weight polymers. The most useful caseinates are in the form of sodium, potassium, ammonium, calcium and calcium/sodium salts.

The dairy whey which is used in the compositions of the present invention is the milk serum of cows milk. It is the liquid remaining after essentially all of the fat and casein (or curd) are removed from the milk. The preferred form of dairy whey is dried and has the following components in the following weight %:

| Components of Dairy Whey | Weight % of Component |
|---|---|
| Lactose | 70 to 80 |
| Water | 2 to 4.5 |
| Fat | 0.5 to 1.0 |
| Protein total | 11 to 15 |
| Ash | 6 to 8 |
| Lactic Acid | 0.1 to 0.3 |
| | 100 |

The cheese analog products of the present invention contain the following components in the following weight %:

| Component of Soy Milk Analog Cheese Product | Weight % of Component | |
|---|---|---|
| | Broad | Preferred |
| Water | 38 to 58 | 48.0 ± 2 |
| Soy Milk | 9 to 19 | 14.0 ± 2 |

| Component of Soy Milk | Weight % of Component | |
| Analog Cheese Product | Broad | Preferred |
|---|---|---|
| Vegetable Oil | 14 to 22 | 18.0 ± 2 |
| Dairy Whey | 7 to 13 | 10.0 ± 1.5 |
| Caseinate | 2 to 10 | 6.0 ± 2 | with the remainder, if any, being flavoring and colorants, to total 100%.

The vegetable oils that may be used in the compositions of the present invention would include soybean oil, palm kernel oil, coconut oil, cottonseed oil, corn oil and peanut oil.

The vegetable oils may be an aqueous emulsion of hydrogenated vegetable oil such as coconut oil and/or palm kernel oil, having a relatively high (45–50%) content of lauric acid, and which has a melting point of 102°±2° F.

The following example is merely illustrative of the present invention and it is not intended as a limitation upon the scope thereof.

EXAMPLE

A cheese analog product of the present invention was prepared from the following components.

| Component of Cheese Analog Product | Grams | Weight % Of Component Used |
|---|---|---|
| Water | 242.60 | 47.95 |
| Soy Milk | 70.00 | 13.84 |
| Fat hydrogenated coconut/palm kernel fat | 53.45 | 10.57 |
| Dairy Whey | 49.00 | 9.69 |
| Soy Bean Oil | 35.65 | 7.05 |
| Na Caseinate | 30.00 | 5.93 |
| Givaudan TL-899-A natural cheddar fla. | 6.40 | 1.27 |
| Alex Fries 1600 natural cheddar fla. | 6.00 | 1.19 |
| Gelatin-235 Bloom | 5.00 | 0.99 |
| Tetra-sodium pyrophosphate (TSPP) | 2.10 | 0.41 |
| Salt | 2.10 | 0.41 |
| $Ca_3(PO_4)_2$ | 2.00 | 0.39 |
| Edlong 1195 natural cheese flavor | 1.60 | 0.31 |
| | 505.90 | 100.00 |

These cheese analog product was prepared from these components as follows:

The soy milk, dairy whey, Na caseinate, gelatin, TSPP, salt and $Ca_3(PO_4)_2$ were dry blended together with a paddle in a heated (with a circulating bath) five quart covered Hobart mixer at 180° F. for 5 minutes at No. 1 speed.

Then the soybean oil and coconut palm kernel oil which had both been preheated to 200° F. were added to the dry blend by admixing the system for one minute on Speed No. 1.

Each flavor was then added separately and the water, preheated to 175°±5° F. was then added while mixing for 30 seconds on speed No. 1. Then the mixture was mixed for 30 seconds on speed No. 2, and finally for two minutes on speed No. 3.

Deaeration of the admixed formulation was optional. The product was then molded by placing it in a lined loaf pan and refrigerated. The product was adaptable to being frozen for long term (6±1 months) storage.

As compared to the prior art cheese analog products, the cheese analog product of the present invention made as described above, had better melting and mouthfeel qualities due to the absence of citrate buffering agents without having any grittiness or off-flavor characteristics. When subjected to repeated freeze/thaw cycles, it did not suffer any loss in its textural qualities. It had less animal protein than the prior art cheese analog product. It had a natural, unbuffered, pH of about 7.0±0.5 (or 6.5–7.5) and preferrably about 7.0±0.2, which obviated the need for a citrate buffering agent system.

What is claimed is:

1. A cheese analog product having a natural pH of about 7.0±0.05 and being a water dispersion comprising the following components in the following weight percent:

| Component | Weight % Range |
|---|---|
| Water | 38 to 58 |
| Dried Soy Milk | 9 to 19 |
| Vegetable Oil | 14 to 22 |
| Dried Dairy Whey comprising a total protein component within the range from about 11 to about 15 weight % | 7 to 13 |
| Caseinate | 2 to 10 | with the remainder, if any, being flavorants and colorants, to total 100%.

2. A cheese analog product as claimed in claim 1 having a natural pH 7.0±0.5 and comprising the following components in the following weight percent:

| Component | Weight % Range |
|---|---|
| Water | 48.0 ± 2 |
| Dried Soy Milk | 14.0 ± 2 |
| Vegetable Oil | 18.0 ± 2 |
| Dried Dairy Whey comprising a total protein component within the range from about 11 to about 15 weight % | 10.0 ± 1.5 |
| Caseinate | 6.0 ± 2 | with the remainder, if any, being flavorants and colorants, to total 100%.

3. A cheese analog product as in claim 1 which is unbuffered.

4. A cheese analog product as in claim 2 which is unbuffered.

* * * * *